United States Patent
Yee et al.

(10) Patent No.: US 11,481,001 B2
(45) Date of Patent: Oct. 25, 2022

(54) SYSTEM FOR DUAL DISPLAYS

(71) Applicant: Intel Corporation, Santa Clara, CA (US)

(72) Inventors: Chee Chun Yee, Batu Maung Penang (MY); Tin Poay Chuah, Bayan Baru Pulau Pinang (MY); Yew San Lim, Gelugor Pulau Pinang (MY); Min Suet Lim, Gelugor Pulau Pinang (MY); Jeff Ku, Taipei (TW)

(73) Assignee: INTEL CORPORATION, Santa Clara, CA (US)

( * ) Notice: Subject to any disclaimer, the term of this patent is extended or adjusted under 35 U.S.C. 154(b) by 55 days.

(21) Appl. No.: 17/088,620

(22) Filed: Nov. 4, 2020

(65) Prior Publication Data
US 2022/0066509 A1    Mar. 3, 2022

(30) Foreign Application Priority Data

Aug. 27, 2020 (MY) ............................ PI2020004415

(51) Int. Cl.
*G06F 1/16* (2006.01)

(52) U.S. Cl.
CPC ............ *G06F 1/1647* (2013.01); *G06F 1/162* (2013.01); *G06F 1/169* (2013.01); *G06F 1/1681* (2013.01)

(58) Field of Classification Search
CPC ...... G06F 1/1618; G06F 1/162; G06F 1/1647; G06F 1/1681
See application file for complete search history.

(56) References Cited

U.S. PATENT DOCUMENTS

| | | | | |
|---|---|---|---|---|
| 6,728,557 | B1* | 4/2004 | Tracy | G06F 1/1637 439/31 |
| 7,239,898 | B2* | 7/2007 | Lenchik | G06F 1/1616 455/90.3 |
| 7,447,527 | B2* | 11/2008 | Lin | H04M 1/021 455/566 |
| 7,580,518 | B2* | 8/2009 | Harmon | G06F 1/1616 379/433.11 |
| 7,595,980 | B2* | 9/2009 | Wang | H04M 1/0222 455/575.1 |
| D624,037 | S* | 9/2010 | Yun | D14/138 AB |
| 8,606,340 | B2* | 12/2013 | Pegg | G06F 1/1647 455/575.4 |
| D798,304 | S* | 9/2017 | Sung | D14/447 |
| 10,204,592 | B1* | 2/2019 | Trim | G06F 1/1601 |
| 10,355,524 | B2* | 7/2019 | Jabori | H02J 50/05 |
| 10,394,277 | B2* | 8/2019 | Kim | G06F 1/1675 |
| 10,528,359 | B2* | 1/2020 | Klein | G06F 3/1446 |

(Continued)

*Primary Examiner* — Adrian S Wilson
(74) *Attorney, Agent, or Firm* — Viering, Jentschura & Partner MBB

(57) ABSTRACT

According to the various examples, a dual display system having a first panel having a first display area, a second panel having a second display area, and a connector assembly, attached to the first and second panels, that is configured to enable the first and second panels to rotate around three-directional axes. The connector assembly includes an elongated member and a hinge assembly, which are configured for attachment to the first and second display panels. The present dual display system may have several functional modalities, including use as a desktop computer, a laptop computer, a tablet, and a panoramic display.

11 Claims, 15 Drawing Sheets

(56) References Cited

U.S. PATENT DOCUMENTS

| | | |
|---|---|---|
| 10,551,878 B2* | 2/2020 | Longo ................ H04M 1/0218 |
| 10,558,277 B2* | 2/2020 | Henell ................ H05K 5/0226 |
| 10,564,677 B2* | 2/2020 | Lee ........................ H05K 7/02 |
| 10,564,818 B2* | 2/2020 | Behar ................ G06F 16/9577 |
| 10,691,177 B2* | 6/2020 | Quinn ................ G06F 3/03547 |
| 10,705,564 B2* | 7/2020 | Abe ..................... G06F 1/1698 |
| 10,747,271 B2* | 8/2020 | Lin ...................... G06F 1/1618 |
| 10,754,390 B2* | 8/2020 | Quinn ................. G06F 1/1669 |
| 2004/0127266 A1* | 7/2004 | Aagaard ............. H04M 1/0222 |
| | | 455/575.1 |
| 2005/0020325 A1* | 1/2005 | Enger ................ H04M 1/0241 |
| | | 455/575.3 |
| 2005/0215297 A1* | 9/2005 | Aoki ................ H04M 1/72463 |
| | | 455/575.3 |
| 2006/0112519 A1* | 6/2006 | Harmon ............... G06F 1/1681 |
| | | 16/367 |
| 2007/0121303 A1* | 5/2007 | Wang ................ H04M 1/0222 |
| | | 361/752 |
| 2012/0229399 A1* | 9/2012 | Kobayashi .......... G06F 3/04883 |
| | | 345/173 |
| 2012/0256929 A1* | 10/2012 | Koenig .................... G09G 5/00 |
| | | 345/503 |
| 2013/0083467 A1* | 4/2013 | Becze ...................... G06T 3/40 |
| | | 361/679.27 |
| 2014/0011548 A1* | 1/2014 | Varela ................... G06F 1/162 |
| | | 455/566 |
| 2017/0090516 A1* | 3/2017 | Ku ....................... G06F 1/1671 |
| 2018/0181271 A1* | 6/2018 | Behar ................ G06F 16/9577 |
| 2019/0025889 A1* | 1/2019 | Szeto ................... G06F 3/1446 |
| 2019/0034147 A1* | 1/2019 | Koki .................... G06F 1/1616 |
| 2019/0179365 A1* | 6/2019 | Honda .................... F16C 11/04 |
| 2019/0189042 A1* | 6/2019 | Aurongzeb ........... G06F 1/1681 |
| 2019/0212778 A1* | 7/2019 | Wu ....................... G06F 1/1677 |
| 2019/0268561 A1* | 8/2019 | Hattar ................... G06F 1/1654 |
| 2019/0286217 A1* | 9/2019 | da Veiga ............... G06F 1/1677 |
| 2019/0383073 A1* | 12/2019 | Zhu ............................ E05D 7/10 |
| 2019/0391621 A1* | 12/2019 | Tsukasaki ............... G06F 1/162 |
| 2020/0110566 A1* | 4/2020 | Reeves ..................... H05K 5/04 |
| 2020/0142455 A1* | 5/2020 | Pasupathi ............ G06F 1/1681 |
| 2020/0233451 A1* | 7/2020 | Hong ................... G06F 1/1669 |
| 2020/0241602 A1* | 7/2020 | Ku ....................... G06F 1/1618 |
| 2020/0241604 A1* | 7/2020 | Nakamura ............ G06F 1/1681 |

* cited by examiner

SYSTEM FOR DUAL DISPLAYS

CROSS-REFERENCE TO RELATED APPLICATIONS

This non-provisional application claims priority to Malaysian Application No. PI2020004415, filed on Aug. 27, 2020, which is incorporated by reference herein in its entirety.

BACKGROUND

A computer with a dual display arrangement is typically able to improve functionality and productivity for a user. It is commonplace for workstations to have a two monitor/display setup to provide a user with the ability to keep multiple application windows open for viewing without the need to locate and switch between these applications. A dual display arrangement is also an alternative to the use of a more expensive large screen monitor.

The present trend is also to have computing devices be portable and present dual display systems generally lack such portability. Laptop and tablet computers provide portability but lack dual displays. In addition, existing dual display systems may not provide a level sight line and may require displays to be disconnected and rearranged, for example, to provide a different aspect ratio for viewing and to switch from portrait mode to landscape mode. The need for burdensome disconnecting and rearrangement for any proposed dual display system may run counter to the desire for portability as well.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. The dimensions of the various features or elements may be arbitrarily expanded or reduced for clarity. In the following description, various aspects of the present disclosure are described with reference to the following drawings, in which.

DETAILED DESCRIPTION

Figure 1A:
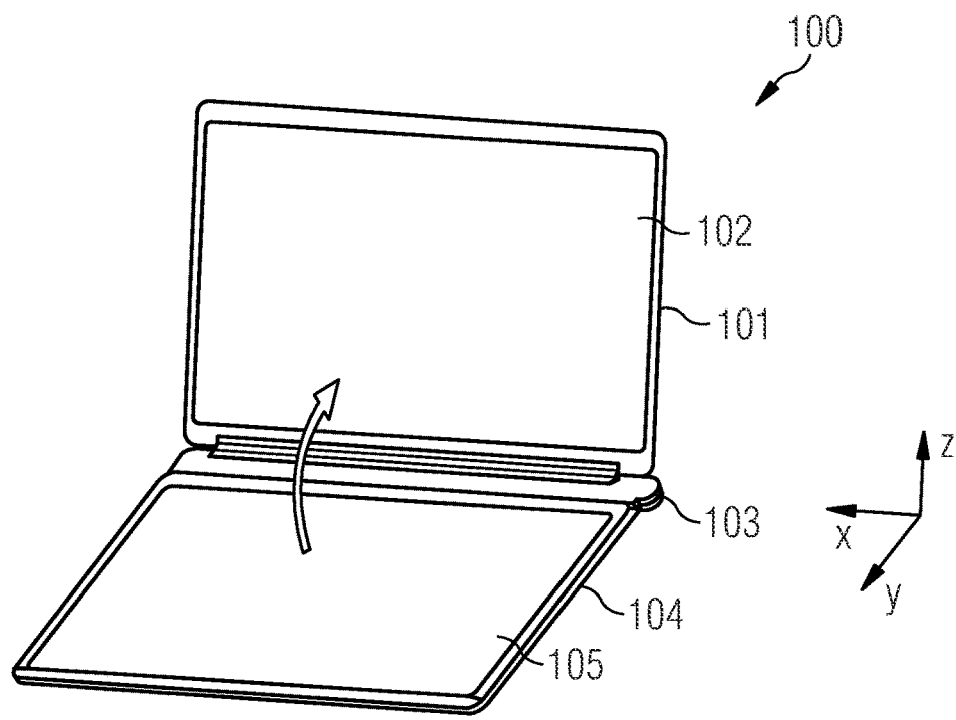
FIG. 1A shows an exemplary view of a dual display system according to an aspect of the present disclosure.

The following detailed description refers to the accompanying drawings that show, by way of illustration, specific details and aspects in which the present disclosure may be practiced. These aspects are described in sufficient detail to enable those skilled in the art to practice the present disclosure. Various aspects are provided for devices, and various aspects are provided for methods. It will be understood that the basic properties of the devices also hold for the methods and vice versa. Other aspects may be utilized and structural, and logical changes may be made without departing from the scope of the present disclosure. The various aspects are not necessarily mutually exclusive, as some aspects can be combined with one or more other aspects to form new aspects.

According to the present disclosure, a dual display system may have a first panel with a first display area, a second panel with a second display area, and a connector assembly attached to the first and second panels to join the first panel to the second panel at an attachment point, with the connector assembly configured to enable the first and second panels to rotate around three-directional axes passing through the attachment point according to the present disclosure. In an aspect, the dual display system may include a panel stand and computer accessories, such as a keyboard, a mouse and/or a joystick.

In another aspect, a dual display system may have a control module coupled to sensor modules to detect the orientation of a first panel in relation to a second panel. In yet another aspect, the dual display system may have several functional modalities providing uses equivalent to, for example, a desktop computer, a laptop computer, and a tablet, as described hereinbelow.

In an aspect, the connector assembly may have an elongated member and a hinge assembly, in which the elongated member and the hinge assembly are configured for attachment to a first panel and a second panel. In another aspect, the hinge assembly may provide attachment points to allow both panels to be rotated or folded around 2 or more axes and enable changing of the aspect ratio for the dual display system depending on the components used for the hinge assembly. In yet another aspect, the hinge assembly may allow both panels to be folded up to 360 degrees around 2 or more axes.

In a further aspect, the hinge assemble may allow the first and second panels to be configured to be viewed by a single user or have one of the panels oriented for ease of viewing by others. A user may view a first panel and present to one or more persons using a second panel.

In the various aspects of the present disclosure, a hinge assembly may enable a first and second panel to be aligned, i.e., opened to 180 degrees, in a side-by-side configuration joined at an attachment point for use in a "portrait" display mode and to be aligned in an end-to-end configuration for use in a "panoramic" display mode. In another aspect, when the dual display system is opened to 180 degrees, a panel stand may be used to support the panels for viewing as discussed below in the description accompanying FIGS. 8, 9, and 10.

In another aspect, the first display area and the second display area may be touch screens for inputting user commands. In yet another aspect, the first and second display area may be LED panels, including OLEDs, mini-LEDs, micro-LEDs and FOLEDs, and/or LCD panels.

According to the present disclosure, the aspect ratio of the dual display system may be controlled by the size of display areas for a first and second panel and by the orientation of the displays. In an aspect, if the dual display system has two display areas of 16:9, then a portrait display mode may provide a standard "book type" ratio, whereas in a panoramic display mode, the aspect ratio goes up to 32:9, which is comparable to high-end gaming displays enjoyed by gamers. Alternatively, if a dual display system has two display areas of 3:2, then in a panoramic display mode, the aspect ratio goes up to 3:1.

In another aspect, a first dual display system may be coupled to a second dual display system to provide a third panel and fourth panel for simultaneously viewing one or more applications as passive displays.

According to the present disclosure, these and other aforementioned advantages and features of the aspects herein disclosed will be apparent through reference to the following description and the accompanying drawings. Furthermore, it is to be understood that the features of the various aspects described herein are not mutually exclusive and can exist in various combinations and permutations.

As shown in FIG. 1A, an exemplary dual display system 100 may have a first panel 101 with a first display area 102 and a second panel 104 with a second display area 105, with a connector assembly 103 joining the two panels. In an aspect, the first and second panels may rotate around the x-directional axis. In this configuration, according to the present disclosure, the second display area may be provided with a virtual keyboard and the dual display system may have a functional modality of a laptop computer. In another configuration, a first panel may be rotated to approximately 240 degrees or greater (not shown) to permit the first panel to be used in a "presentation" display mode for viewing by individuals facing a user.

Figure 1B:
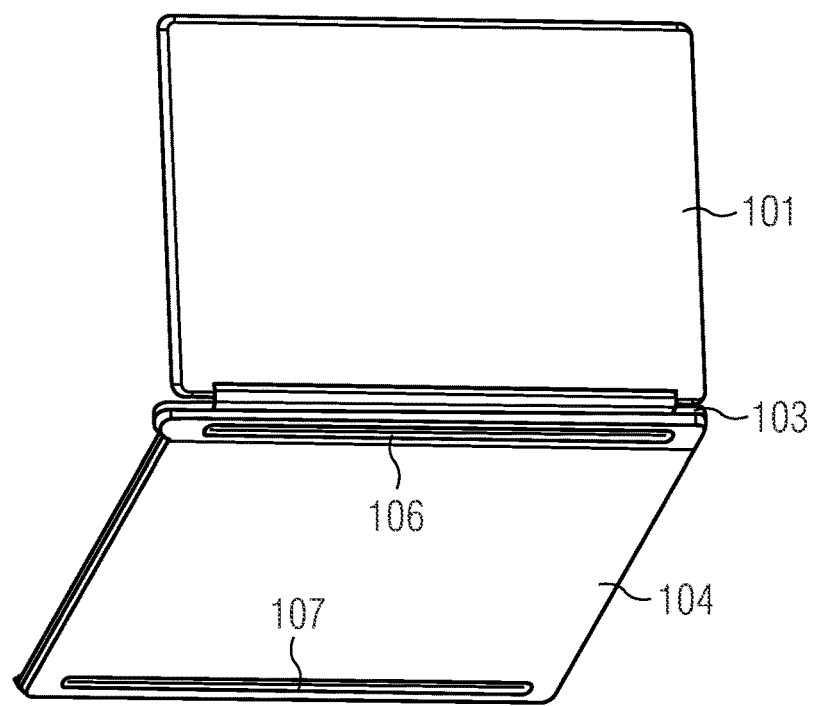
FIG. 1B shows a bottom side view of the dual display system of FIG. 1A.

FIG. 1B shows a bottom side view of the dual display system 100 of FIG. 1A. In this aspect, a back surface of the connector assembly 103 may have a first strip 106 and a back surface of the second panel may have a second strip 107. The first strip 106 and second strip 107 may act as rubberized feet for the dual display system 100 in a laptop modality.

Figure 2A:
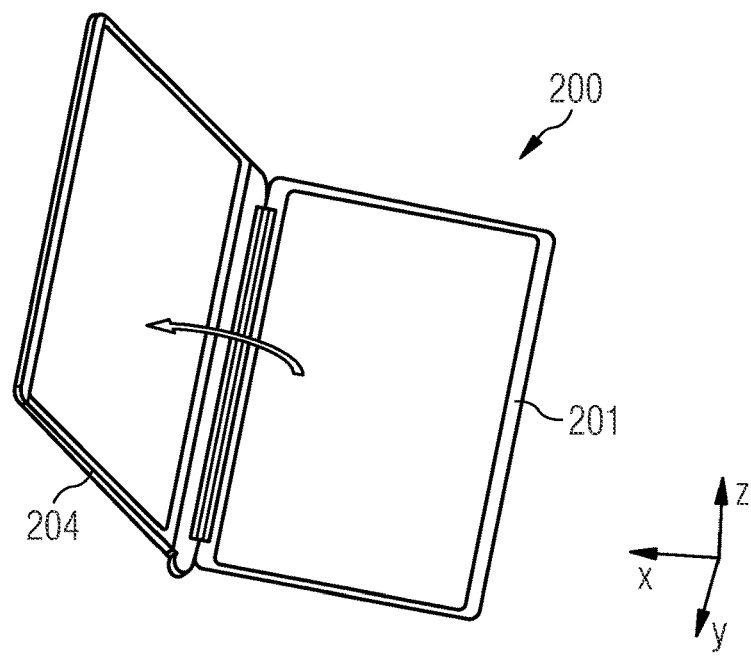
FIG. 2A shows an exemplary view of a dual display system according to another aspect of the present disclosure.
Figure 2B:
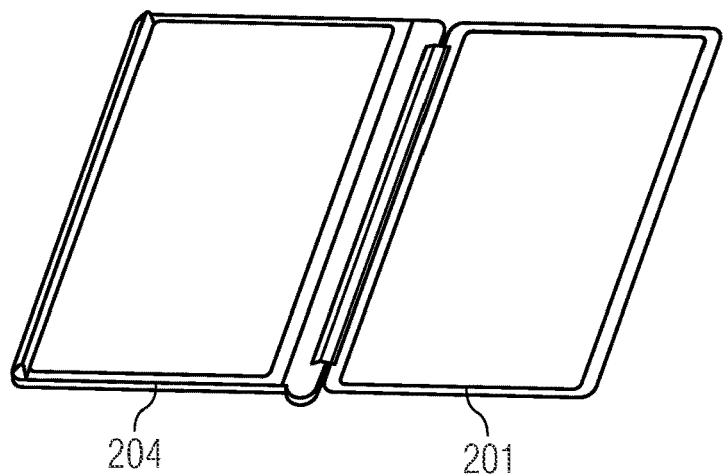
FIG. 2B shows a planar view of the dual display system of FIG. 2A.
Figure 2C:
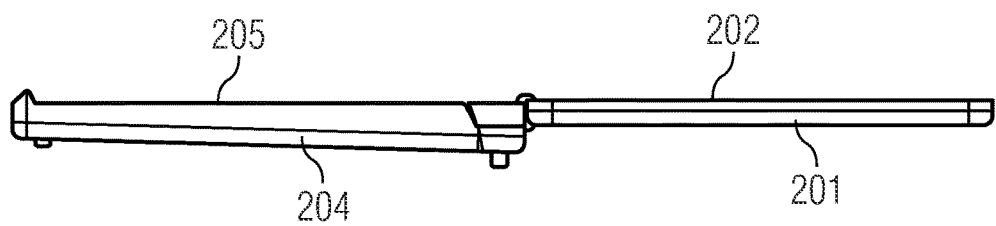
FIG. 2C shows a side view of the dual display system of FIG. 2B.

According to an aspect shown in FIG. 2A, a dual display system 200 may be oriented for rotating along the y-directional axis. As shown in FIG. 2B, in this aspect, a first panel 201 and a second panel 204 may be aligned, i.e., opened to 180 degrees, in a portrait display mode for possible use in a reader modality. FIG. 2C shows a side view of the dual display system 200 in the alignment of FIG. 2B. In this aspect, the first panel 202 has a first display area 202 that is co-planar with a second display area 205 of the second panel 204. In another aspect, the second panel 204 may have a thicker profile to house an electronic circuit board (not shown) for the dual display system 200 and a side panel may include USB ports, a headphone jack, and other input/out ports (not shown). In a further aspect, a first panel and a second panel may have the same thickness.]

Figure 3A:
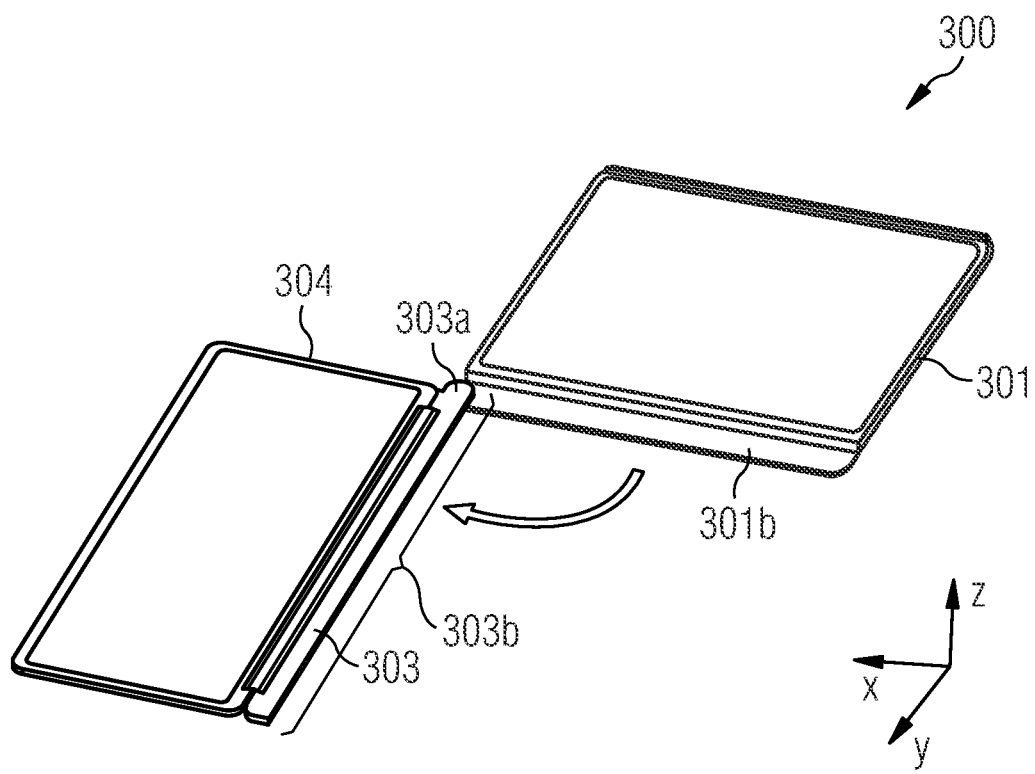
FIG. 3A shows an exemplary view of a dual display system according to yet another aspect of the present disclosure.

FIG. 3A shows an exemplary view of a dual display system 300 according to yet another aspect of the present disclosure. In an aspect, a first panel 301 and a second panel 304 may be attached at a distal end 303a of connection assembly 303, i.e., an attachment point, and may rotate around the z-directional axis at the distal end 303a, while an elongated member 303b may disengage from a side edge 301b of the first panel 301. In another aspect, the elongated member 303b may be held at the side edge 301b by magnet components built into the elongated member 303b or the side edge 301b.

Figure 3B:
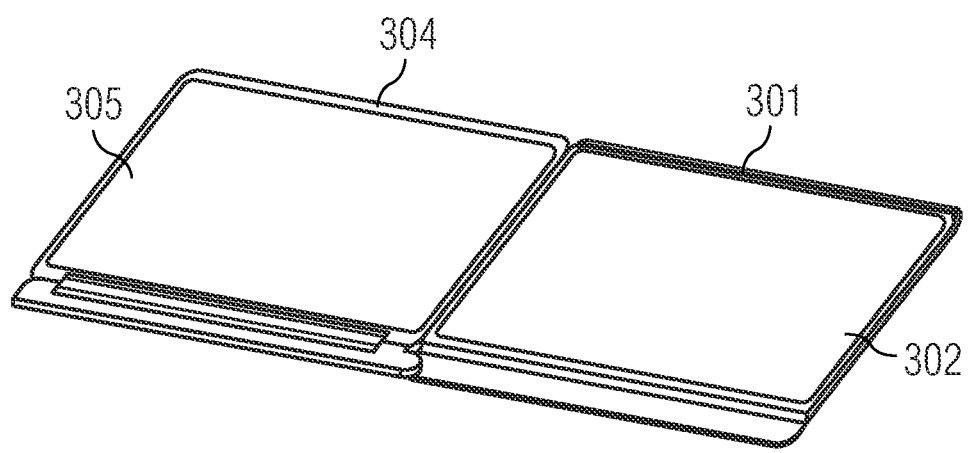
FIG. 3B shows a planar view of the dual display system of FIG. 3A.

FIG. 3B shows a planar view of the dual display system 300 of FIG. 3A having a first display area 302 and a second display area 305 that may be a similar size and aligned, i.e., opened to 180 degrees, in a panoramic display mode. In this configuration, the first display area 302 may be a primary screen, and the second display a secondary screen or vice versa.

Figure 4A:
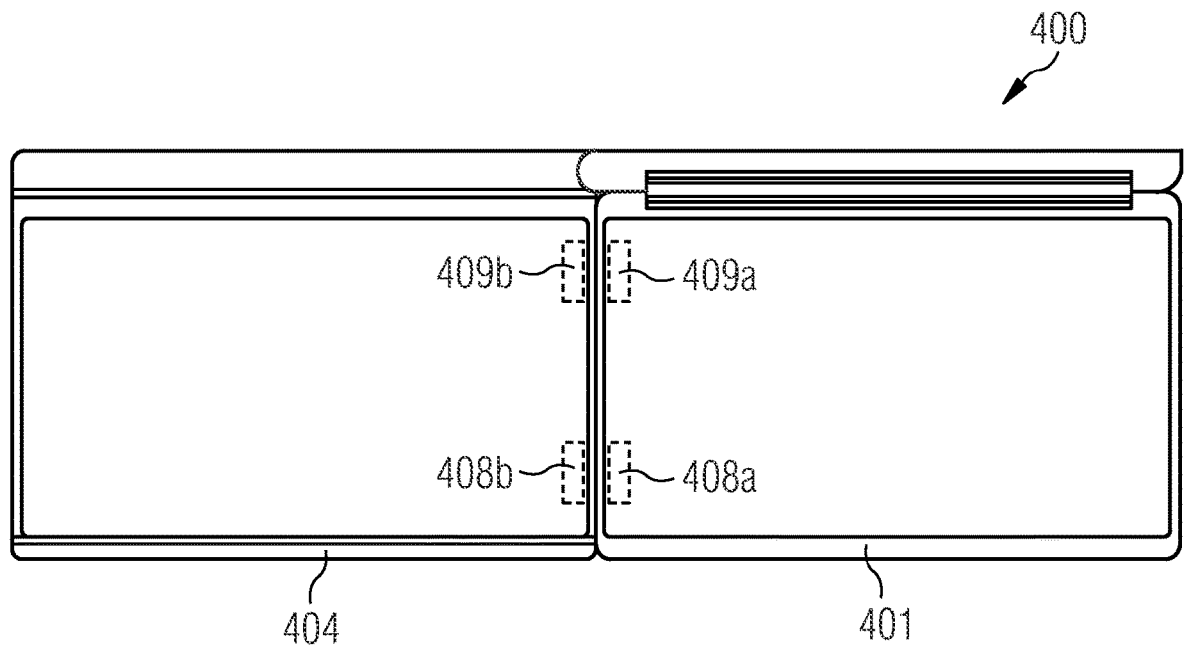
FIG. 4A shows an exemplary view of a dual display system according to a further aspect of the present disclosure.
Figure 4B:
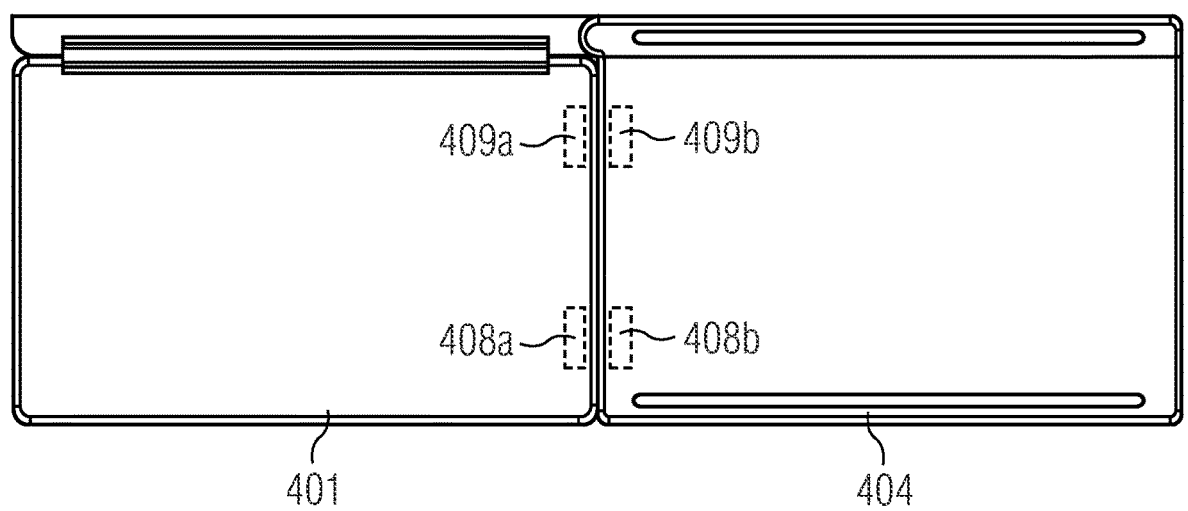
FIG. 4B shows a bottom side view of the dual display system of FIG. 4A.

In another aspect, FIG. 4A shows an exemplary view of a dual display system 400 in a panoramic display mode and FIG. 4B shows a bottom side view of the dual display system 400 according to a further aspect of the present disclosure. The dual display system 400 may have a first panel 401 and a second panel 404, in which the first panel 401 may optionally have magnets 408a and 409a and the second panel may have their complementary optional magnets 408b and 409b. The paired magnets 408 and 409 may help the first panel 401 and the second panel 404 to maintain the end-to-end configuration without a gap between them. In an aspect, the paired magnets 408 and 409 may be placed internally in the first panel 401 and the second panel 404 or placed externally on their bottom side surfaces. It is within the scope of the present disclosure to position the paired magnets 408 and 409 as may be needed to accommodate internal spacing constraints or design requirements.

Figure 5A:
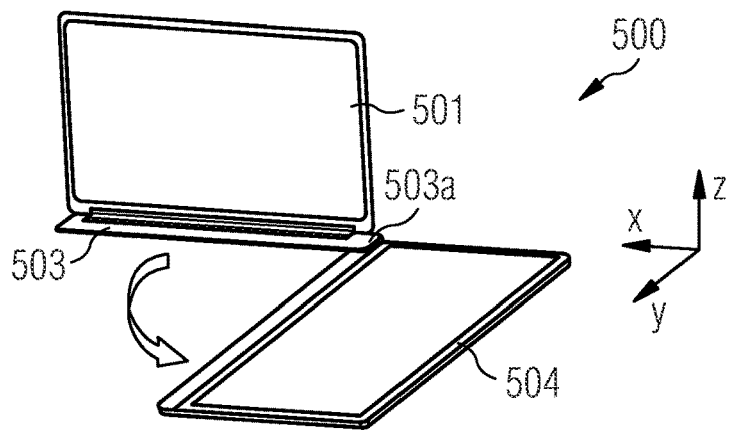
FIG. 5A shows an exemplary view of a dual display system according to another aspect of the present disclosure.
Figure 5B:
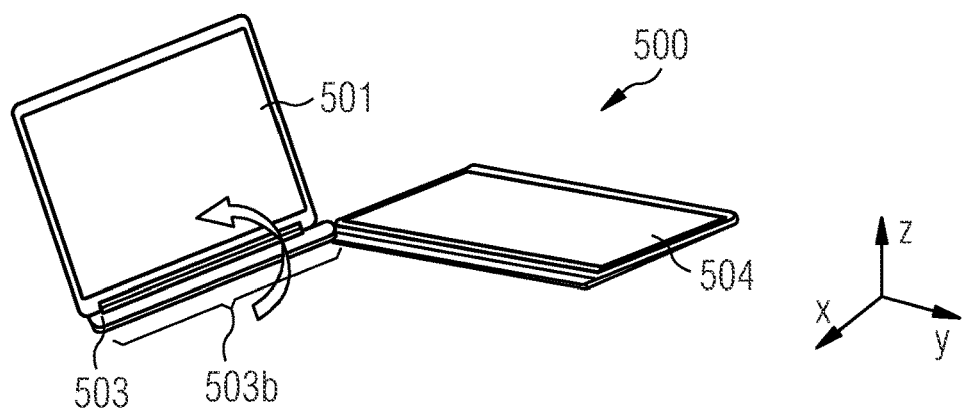
FIG. 5B shows an exemplary view of the dual display system of FIG. 5A.

FIGS. 5A and 5B show exemplary views of a dual display system 500 according to another aspect of the present disclosure. As shown in FIG. 5A, a second panel 504 may be positioned as a level surface and rotate around the z-directional axis passing through a distal end 503a, i.e., an attachment point, of a connector assembly 503, and as shown in FIG. 5B, a first panel 501 may rotate around the x-directional axis running along an elongated member 503b of the connector assembly 503. In this configuration, according to an aspect of the present disclosure, the first panel may be configured for use as a screen and the second display area may be provided with a virtual touchpad, and the dual display system 500 may have a functional modality of a tablet computer.

Figure 5C:
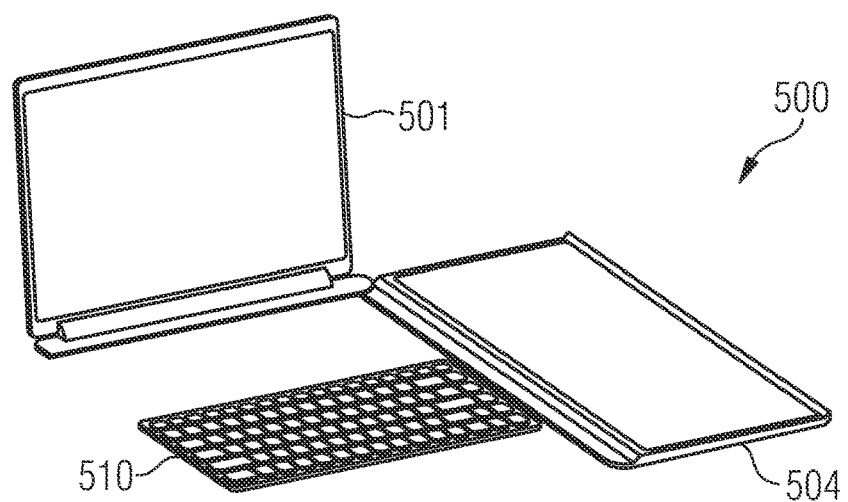
FIG. 5C shows an exemplary view of the dual display system of FIG. 5A according to another aspect of the present disclosure.

As shown in FIG. 5C, the dual display system 500 of FIGS. 5A and 5B may optionally have a keyboard 510 coupled via a wired or wireless connection according to another aspect of the present disclosure. In this configuration, the dual display system 500 may have a functional modality of a desktop computer.

Figure 6A:
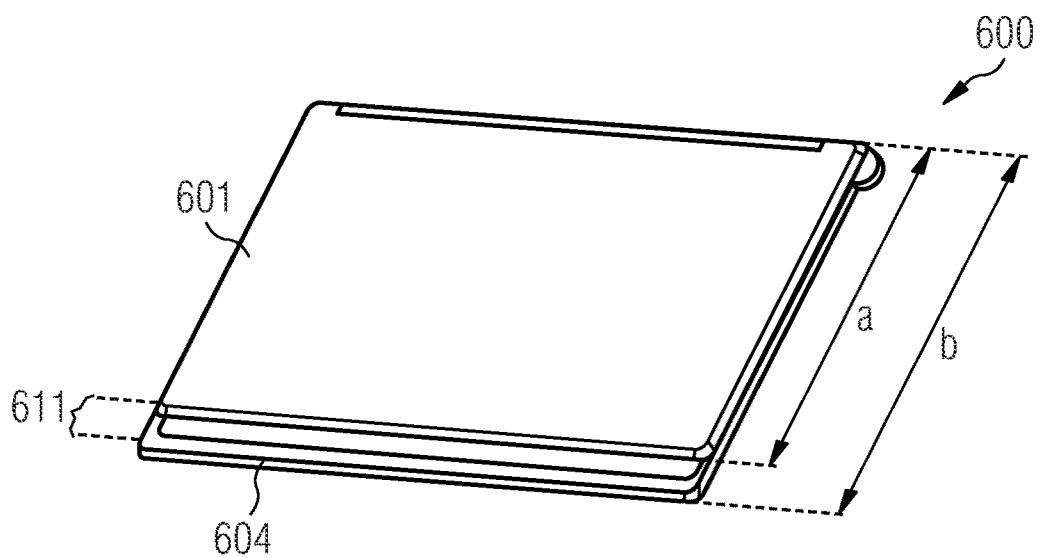
FIG. 6A shows an exemplary view of a dual display system according to a further aspect of the present disclosure.
Figure 6B:
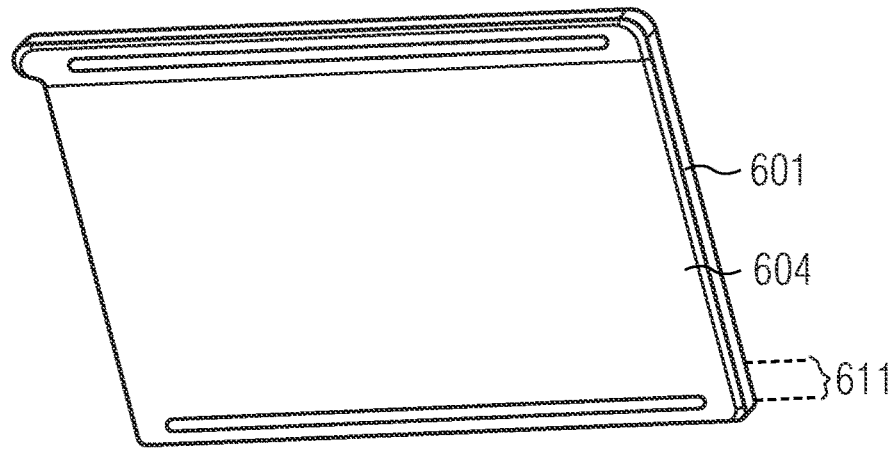
FIG. 6B shows a bottom side view of the dual display system of FIG. 6A.
Figure 6C:
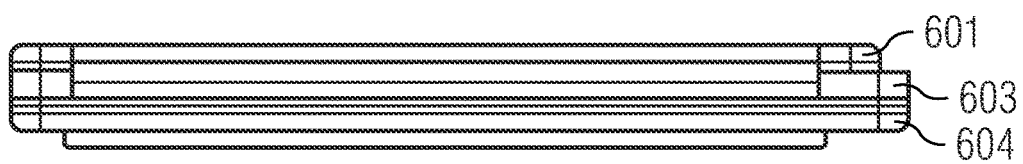
FIG. 6C shows a backside view of the dual display system of FIG. 6A.

In FIGS. 6A, 6B, and 6C, another aspect of a dual display system 600 according to the present disclosure is shown. A first panel 601 may be placed over a second panel 605 in a portable, compact configuration. In this compact configuration, the first panel 601 may be considered as a "lid" covering the second panel 604 in a closed orientation for portability or storage. In this aspect, as shown in FIG. 6A, the first panel 601 may have a width "a" and the second panel 604 may have a width "b", where b is larger than a, and a display section 611 may be purposefully left uncovered by the first panel 601. FIG. 6B shows a bottom side view of the dual display system 600. FIG. 6C shows a backside view of the dual display system 600 of FIG. 6A having a connector assembly 603 positioned between the first panel 601 and second panel 604.

In an aspect of this "closed" orientation for a dual display system, the display section 611 may provide a "secondary" display for notifications or application controls; for example, text messaging, audio controls, a power button, and other controls. In some aspects, the display section 611 may have a width of approximately 20 mm, when a first display area of a first panel and a second display area of a second panel are substantially the same.

Figure 7:
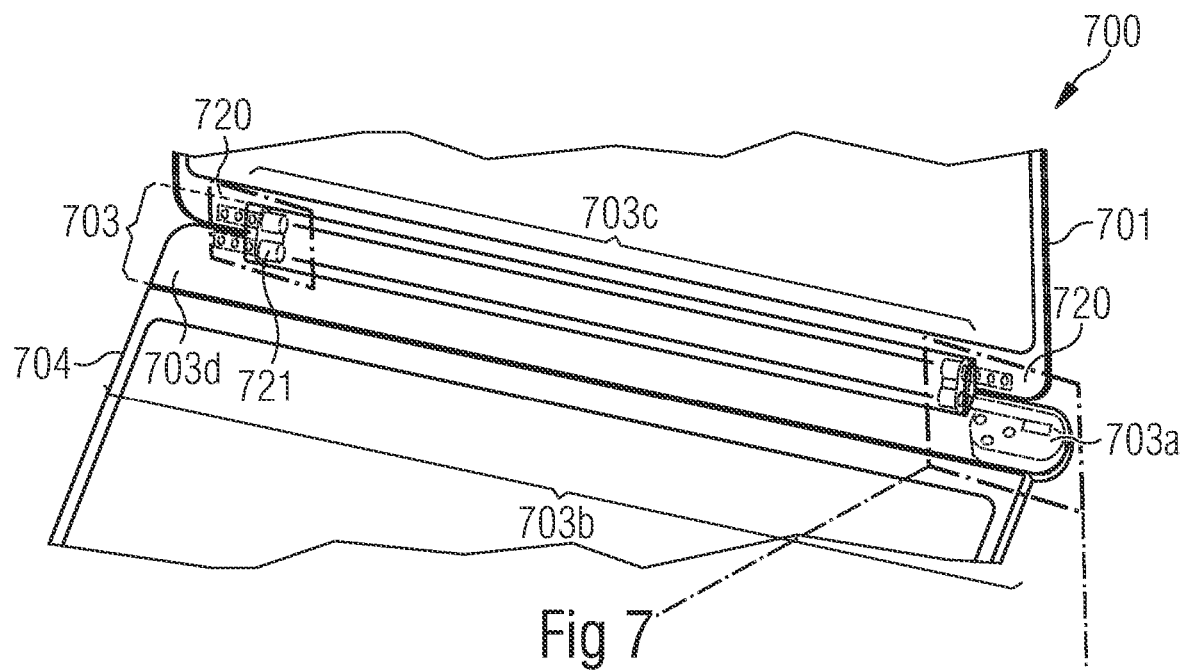
FIG. 7 shows an exemplary connector assembly of a dual display system according to an aspect of the present disclosure.
Figure 7A:
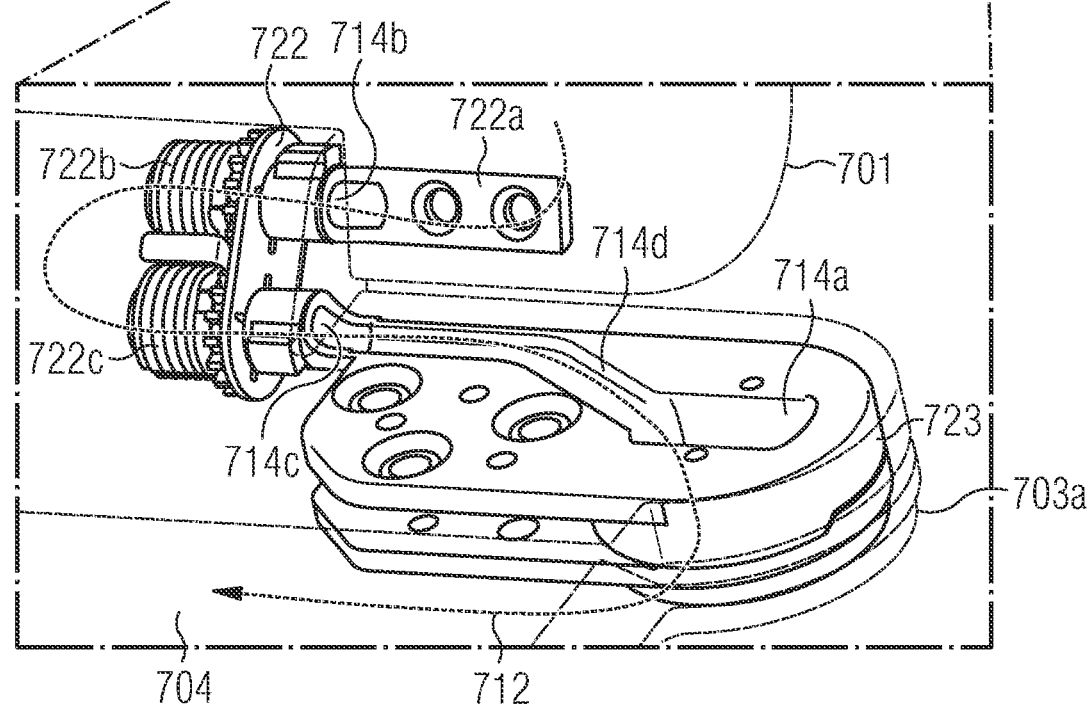
FIG. 7A shows an exemplary hinge assembly of the connector assembly of FIG. 7.
Figure 7B:
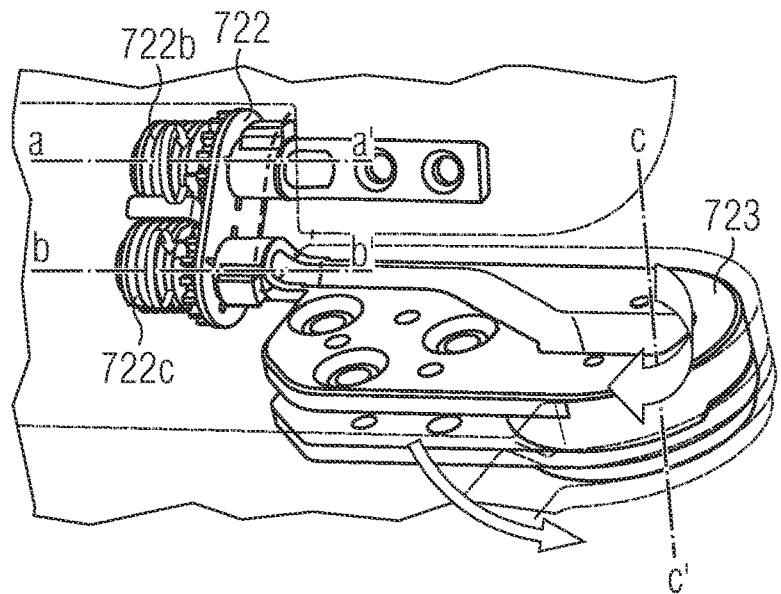
FIG. 7B shows an additional view of the exemplary hinge assembly of the connector assembly of FIG. 7A.
Figure 7C:
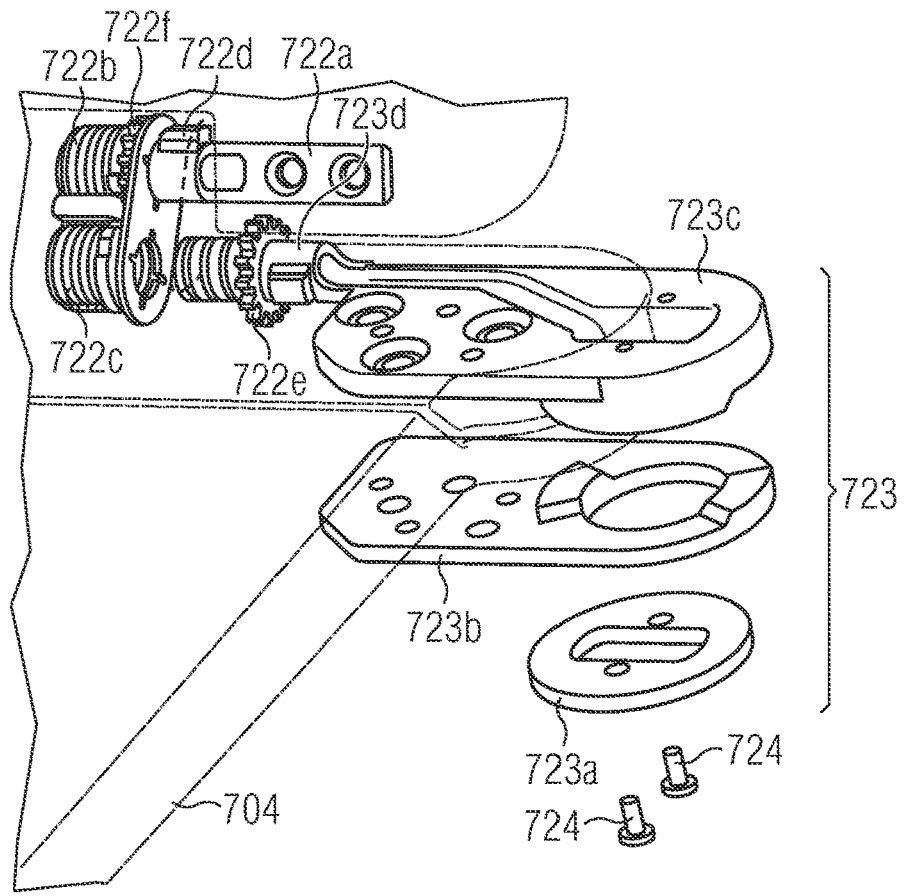
FIG. 7C shows a further view of the exemplary hinge assembly of the connector assembly of FIG. 7A.

FIG. 7 shows an exemplary connector assembly 703 of a dual display system 700 with an elongated member 703b and a hinge assembly 720, and FIGS. 7A, 7B and 7C show an expanded view of exemplary multi-axial components of the hinge assembly 720 located near a distal end 703a of the connector assembly 703 according to aspects of the present disclosure.

In the aspect shown in FIG. 7, a first panel 701 and a second panel 704 may be attached to the connector assembly 703. In this aspect, the connector assembly 703 may have the elongated member 703b, with a moveable section 703c, and the hinge assembly 720, which may have two subcomponents—a first dual axis component 721 (located near a proximal end 703d of the connector assembly 703), and a second dual axis component 722 and a pivot component 723 (which are located near the distal end 703a of the connector assembly 703 and referenced in FIG. 7A). In another aspect, the first dual axis component 721 and the second dual axis component 722 may be housed in the moveable section 703c of the connector assembly 703, while the pivot component 723 may be housed in the elongated member 703b.

It should be understood that a connector assembly of the present disclosure may be provided with alternative hinge assemblies, and it is within the scope of the present disclosure to use, for example, pivot joints, ball and socket joints, swivel joints and other multi-axis hinge assemblies as subcomponents herein. In an aspect, a hinge assembly may have three-degrees of rotational freedom to allow a first panel and a second panel to rotate according to the present disclosure.

As shown in FIG. 7A, for this subcomponent of the hinge assembly, the second dual axis component 722 and the pivot component 723 may be located near the distal end 703a of the connector assembly 703 and may be configured to accept a connection cable (not shown) that couples the first panel 701 and the second panel 704 according to this aspect of the present disclosure. The second dual axis component 722 and the pivot component 723 may provide a multi-axial structure that acts as an attachment point for the connector assembly 703 to join the first panel 701 to the second panel 704. It is within the scope of the present disclosure to use, for example, a co-axial cable, a flat ribbon cable, optical cable, or another flexible cable as a connection cable herein.

In an aspect shown in FIG. 7A, a cable path 712 is shown without depicting a connection cable. The second dual axis component 722 may have a plate member 722a, which may be attached to the first panel 704 by screws (not shown), and a first hollow threaded member 722b and a second hollow threaded member 722c, with the pivot component 723 movably attached to the second hollow threaded member 722c. The cable path 712 may start at the first panel 701, pass through an opening 714b of the first hollow threaded member 722b and loop back through an opening 714c of the second hollow threaded member 722c, and follow a channel 714d and pass through an opening 714a in the pivot component 723 to reach the second panel 704. It is within the scope of the present disclosure to employ alternative cable paths that may not pass through a subcomponent of a hinge assembly FIG. 7B shows an aspect of the present disclosure, for the second dual axis component 722, the first hollow threaded member 722b may enable rotation around a first directional axis (shown as dashed line a-a'), and the second hollow threaded member 722c may enable rotation around a second directional axis (shown as dashed line b-b"), according to the present disclosure. In this aspect, the first and second directional axes extend to the complementary first dual axis component 721 (not shown) for rotating the first and second panels 701 and 704, respectively. In another aspect, the pivot component 723 may enable rotation around a third directional axis, shown as dashed line c-c'. The second dual axis component 722 and the pivot component 723 may provide an attachment point for the connector assembly 703 that enables the first and second panels to rotate around directional axes passing through the attachment point. The rotational movement around the first, second, and/or third directional axis may occur independently of one another. In addition, it is within the scope of the present disclosure to employ various rotation stop mechanisms, including friction, ratchet locking, etc.

In FIG. 7C, exemplary parts of the pivot component 723 of the hinge assembly 703 (as shown in FIG. 7) may have a base plate 723a, a swivel plate 723b, and a pivot body 723c with a threaded extension 723d. In this aspect, as shown in FIG. 7C, the base plate 723a may be attached to the pivot body 723c by screws 724 and acts to hold the swivel plate 723b in place. The pivot body 723c may be attached to the elongated member 703b. The swivel plate 723b may be attached to the second panel 705, which enables the second panel 704 to rotate around the third directional axis c-c' shown in FIG. 7B.

In yet another aspect, the threaded pivot extension 723d may be insertably attached to the second hollow threaded member 722c and held in place by a sprocket fastener 722e (shown for illustrative purpose in its normal position on the threaded extension 723d). When assembled, the sprocket fastener 722e may be positioned alongside a sprocket fastener 722e, which may be positioned on a threaded plate extension 722d and inserted into the first hollow threaded member 722b as shown in FIG. 7C.

Figure 8A:
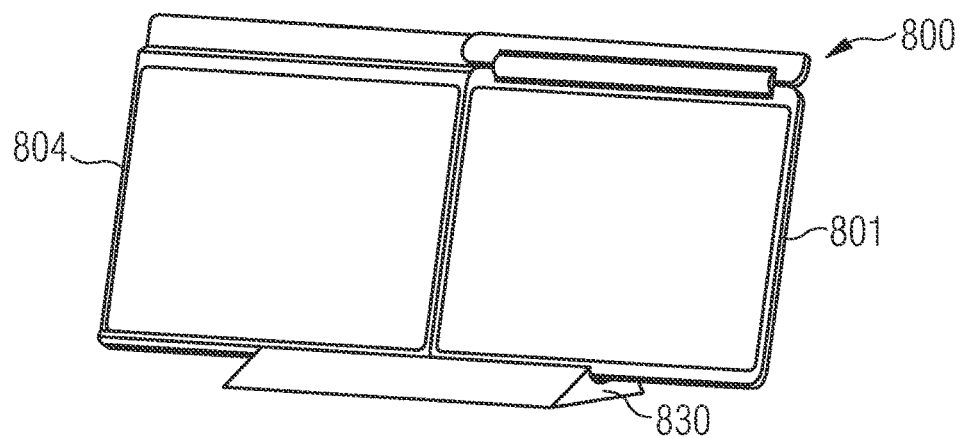
FIG. 8A shows an exemplary view of a dual display system according to a further aspect of the present disclosure.
Figure 8B:
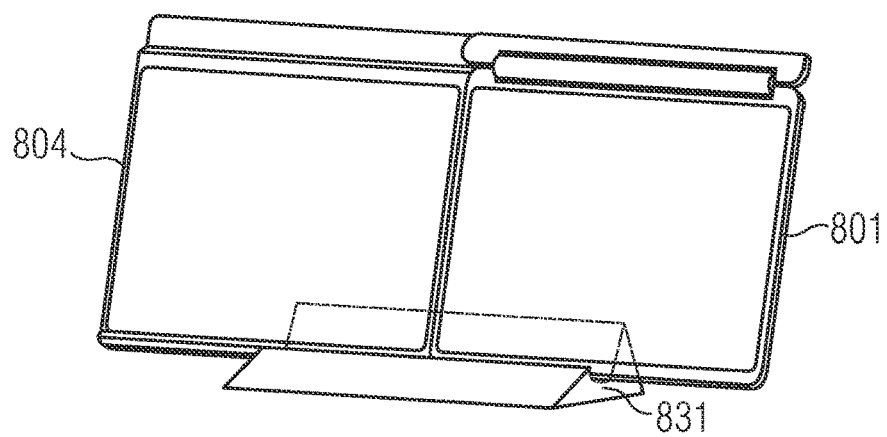
FIG. 8B shows an additional view of the dual display system of FIG. 8A.
Figure 8C:
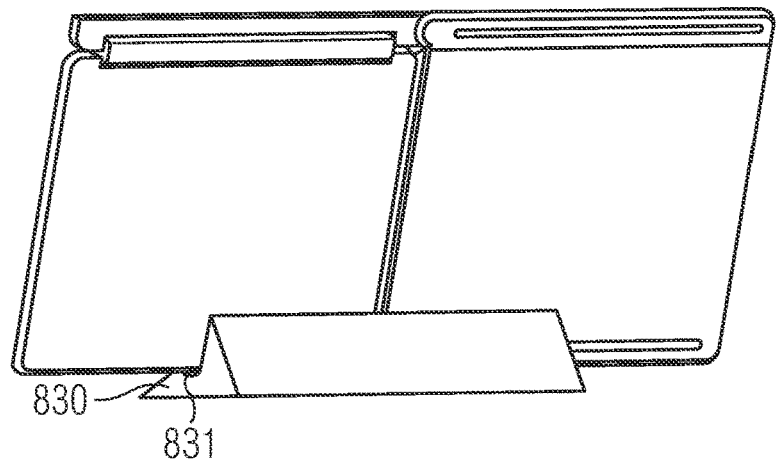
FIG. 8C shows a bottom side view of the dual display system of FIG. 8A.

FIGS. 8A, 8B, and 8C show exemplary views of a dual display system 800 that includes a stand 830 according to a further aspect of the present disclosure. In an aspect, the stand 830 may have grove 831 for holding first and second panels 801 and 804 configured in a panoramic display mode, as shown in FIG. 4A. While not shown, the stand 830 may also be used for holding the first and second panels 801 and 804 in portrait display mode, as shown in FIG. 2A.

In the aspects shown in FIGS. 8B and 8C, the profile for the stand 830 may be generally shaped like a triangle, but it is within the scope of the present disclosure to use alternative shapes that will provide a stable base for the panels.

Figure 9A:
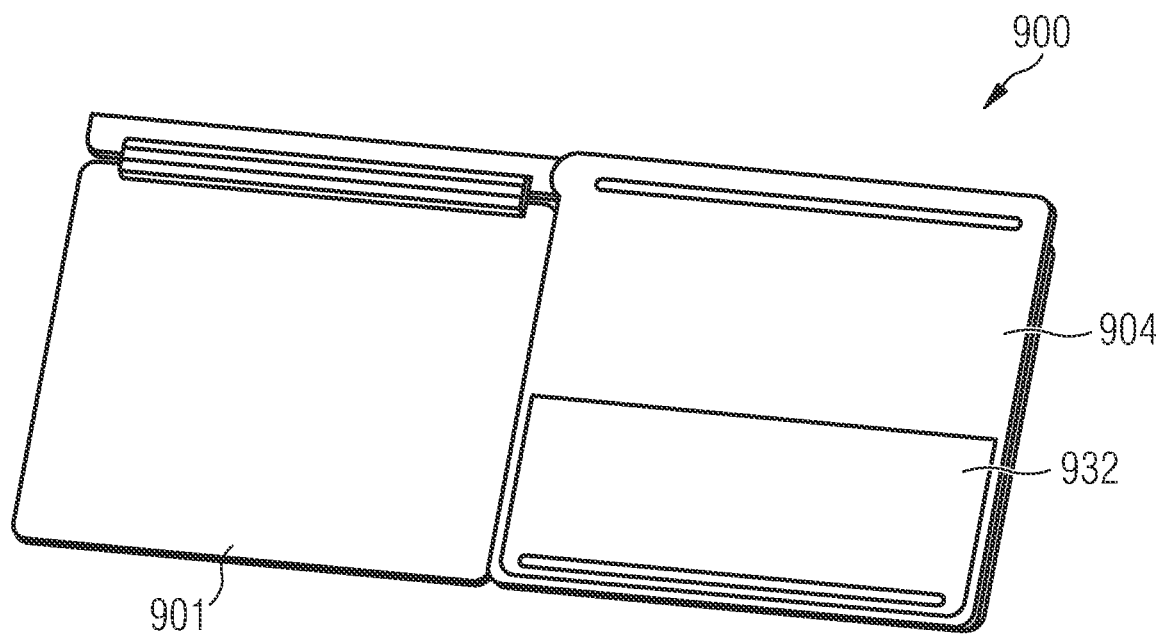
FIG. 9A shows an exemplary view of a dual display system according to another aspect of the present disclosure.
Figure 9B:
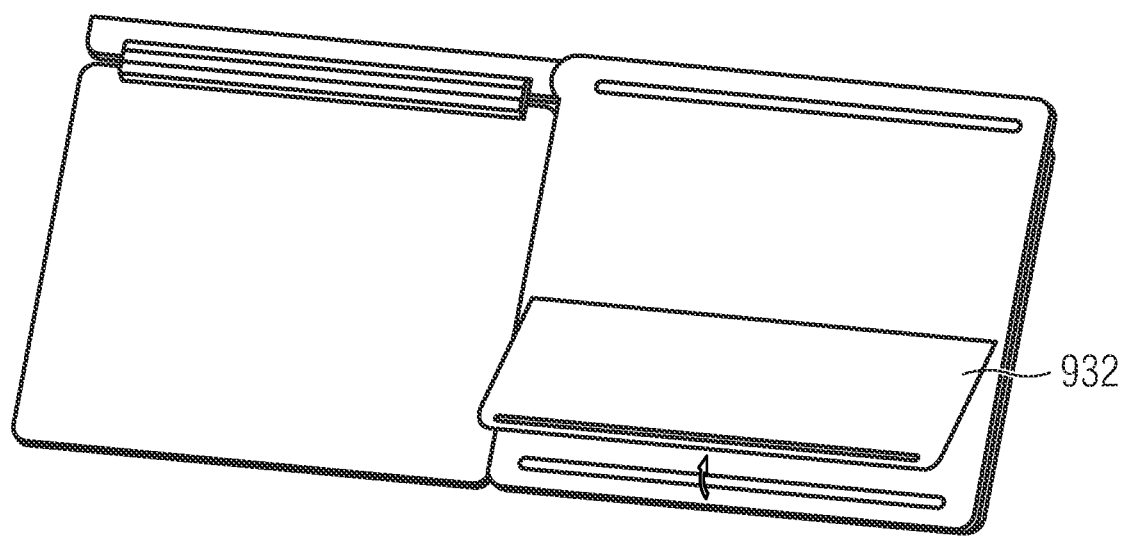
FIG. 9B shows a further view of the dual display system of FIG. 9A.
Figure 9C:
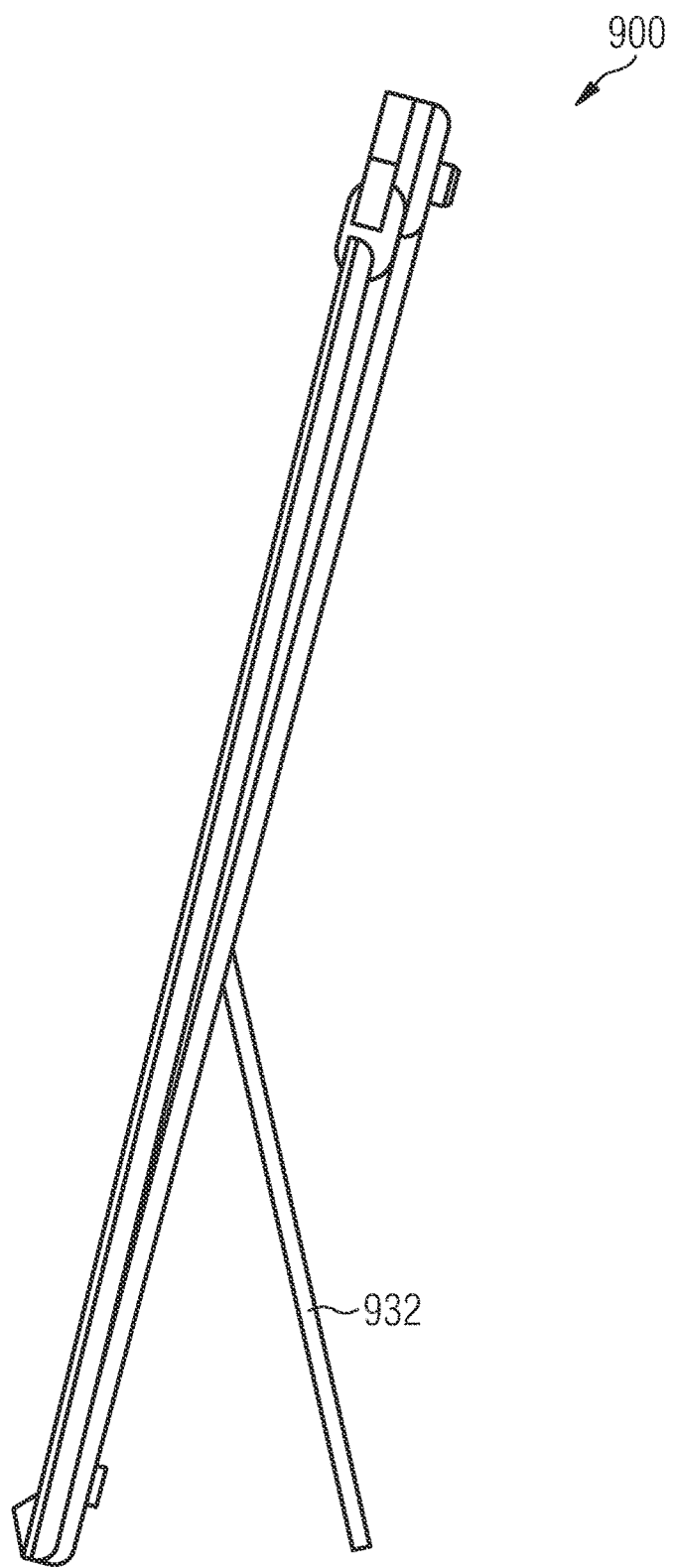
FIG. 9C shows a side view of the dual display system of FIG. 9A.

FIGS. 9A and 9B show exemplary backside views of a dual display system 900 according to another aspect of the present disclosure. In this aspect, the dual display system 900 may have first and second panels 901 and 904, respectively, configured in a panoramic display mode and the second panel 904 may have a fold-out panel 932 that enables the dual display system 900 to be supported in an upright position. In FIG. 9C, a side view of the dual display system 900 with fold-out panel 932 positioned to hold the dual display system 900 in the upright position for viewing by a user. It is within the scope of the present disclosure to position the fold-out panel 932 on the back of the first panel 901 or to add a second fold-down panel (not shown) on the back of the first panel 1001.

Figure 10A:
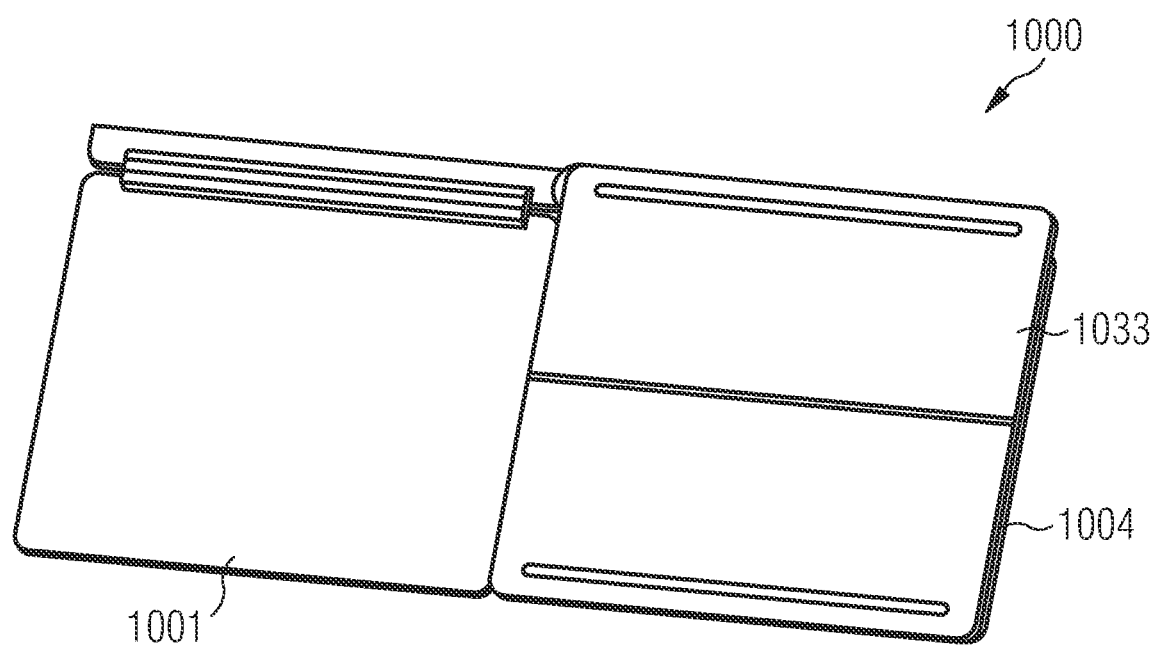
FIG. 10A shows an exemplary view of a dual display system according to yet another aspect of the present disclosure.
Figure 10B:
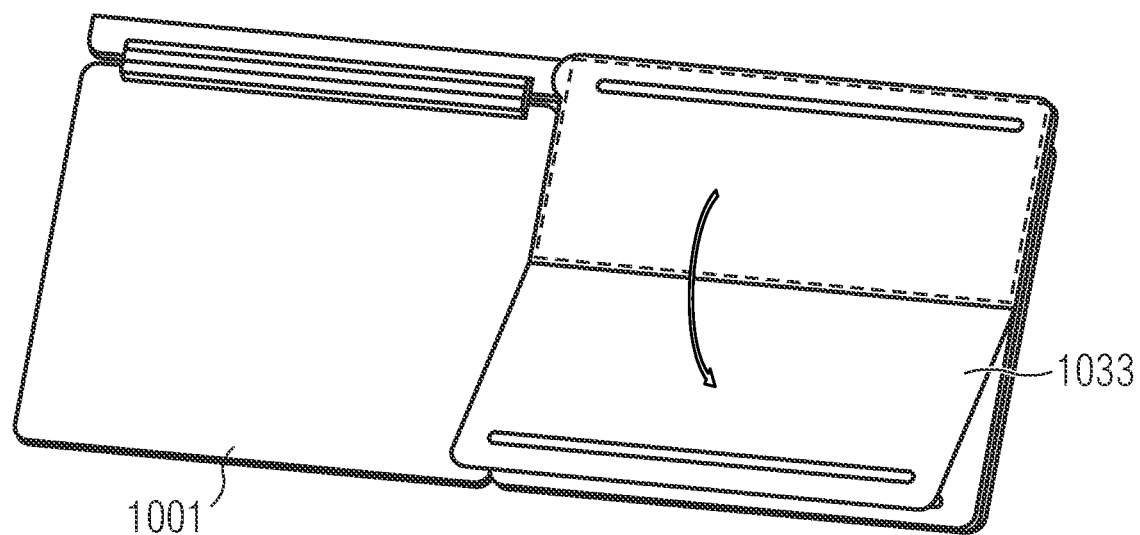
FIG. 10B shows a further view of the dual display system of FIG. 10A.
Figure 10C:
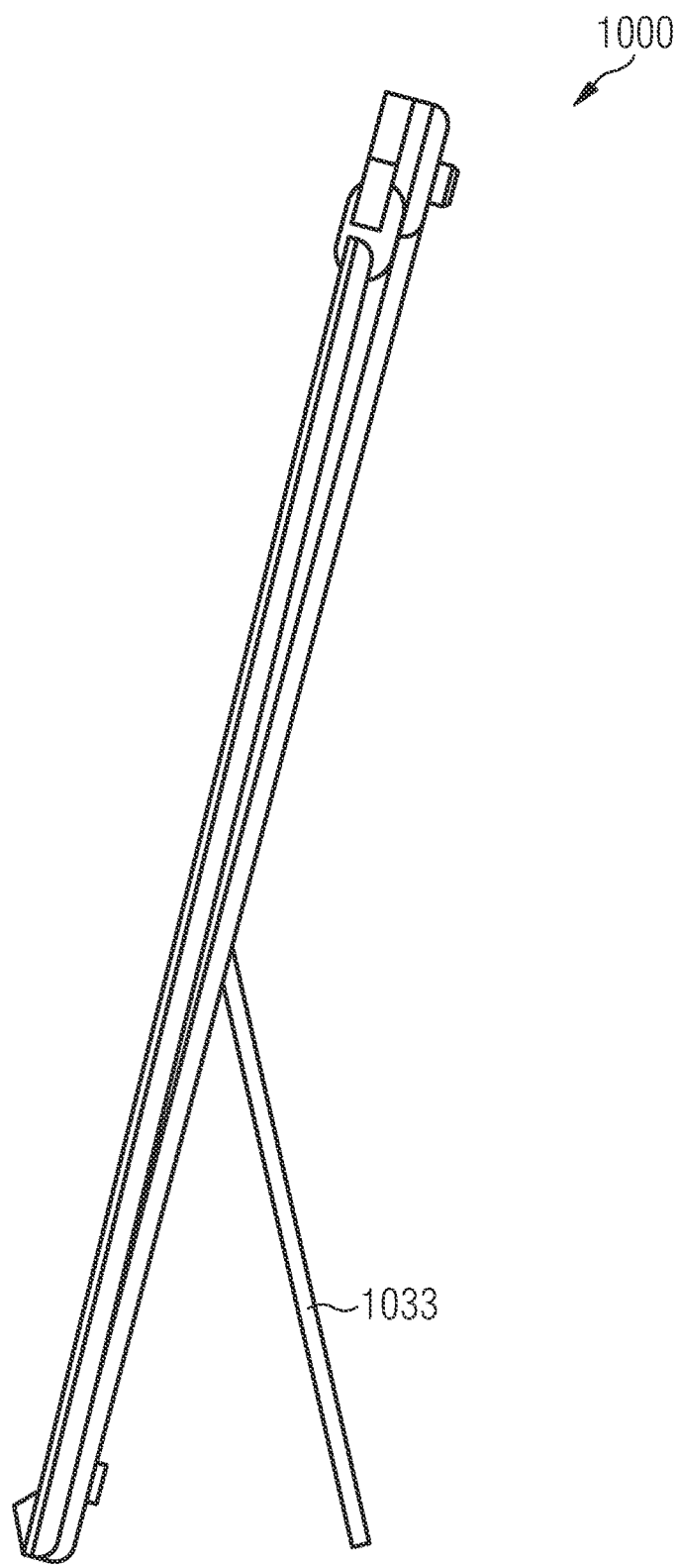
FIG. 10C shows a side view of the dual display system of FIG. 9A.

FIGS. 10A and 10B show exemplary backside views of a dual display system 1000 according to another aspect of the present disclosure. In this aspect, the dual display system 1000 may have first and second panels 1001 and 1004, respectively, configured in a panoramic display mode and the second panel 1004 may have a fold-down panel 1032 that enables the dual display system 1000 to be supported in an upright position. In FIG. 10C, a side view of the dual display system 1000 with fold-down panel 1033 positioned to hold the dual display system 1000 in the upright position for viewing by a user. It is within the scope of the present disclosure to position the fold-down panel 1033 on the back of the first panel 1001 or to add a second fold-down panel (not shown) on the back of the first panel 1001.

Figure 11:
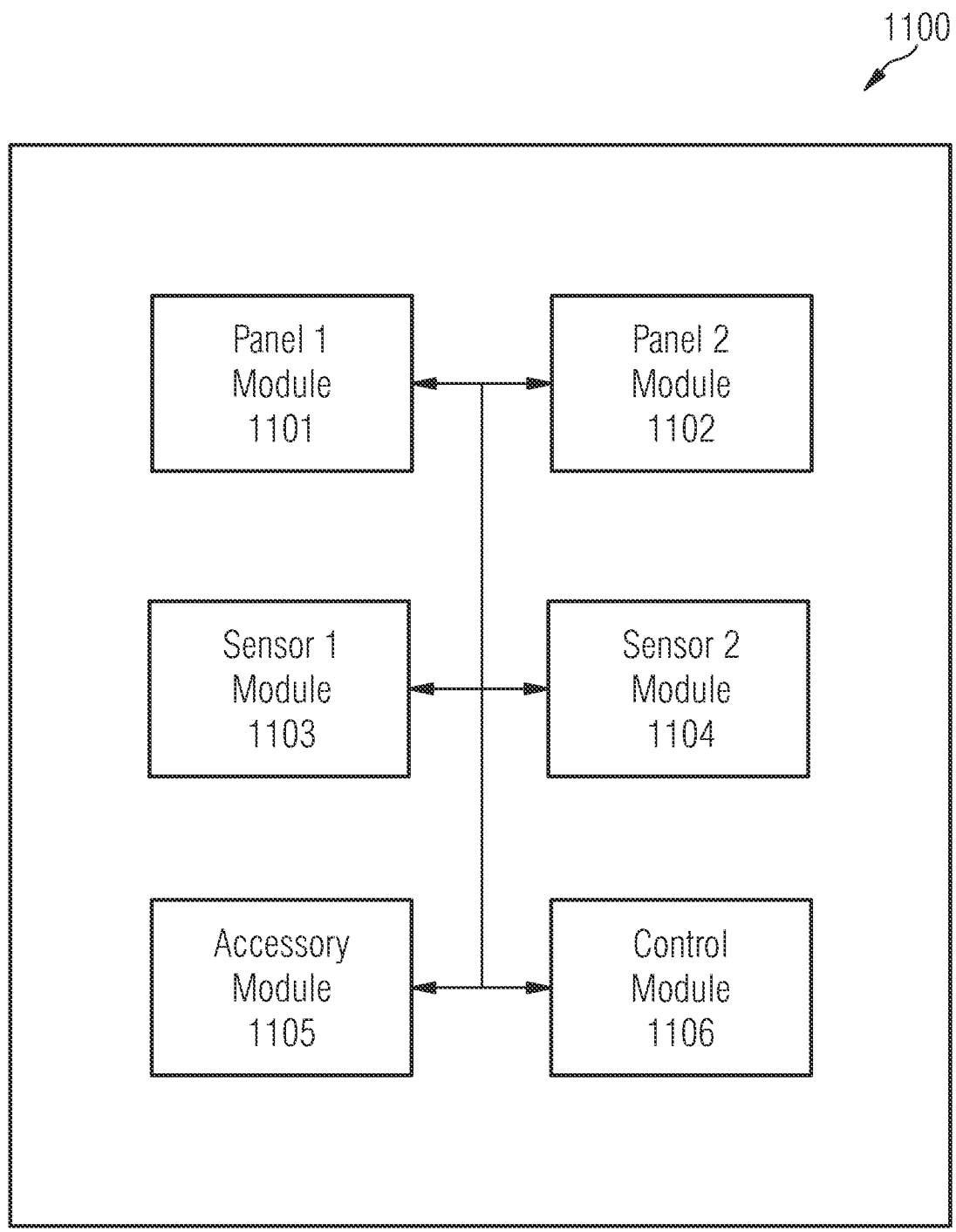
FIG. 11 shows an exemplary representation of functional modules of a dual display system according to an aspect of the present disclosure.

FIG. 11 shows an exemplary representation of functional modules of a dual display system 1100 according to an aspect of the present disclosure. In this aspect, the dual display system 1100 may have a panel 1 module 1101, a panel 2 module 1002, a sensor 1 module 1103, a sensor 2 module 1104, an accessory module 1105, and a control module 1106 may be coupled together to provide instructions and data. In another aspect, a first panel (not shown) may comprise the panel 1 module 1101 and the sensor 1 module 1103 and a second panel (not shown) may comprise the panel 2 module 1102 and the sensor 2 module 1104, and the panel 1 module 1101 may control a first display area of such first panel and the panel 2 module 1102 may control a second display area of such second panel according to the present disclosure.

In another aspect, the sensor 1 module 1103 and/or the sensor 2 module 1104 may include inertial sensors that measure rotation with a gyroscope or position with an accelerometer with respect to a known starting position and orientation, direct field sensors that use known fields to derive orientation or position, or hybrid positioning systems combining two or more technologies.

In yet another aspect, the accessory module 1105 may be configured to provide inputs from computer accessories such as a keyboard, a mouse and/or a joystick that may be included in a dual display system. These computer accessories may provide additional inputs to the control module 1106 according to the present disclosure.

In a further aspect, the control module 1106 may be a board, such as a motherboard, having several components, including, but not limited to, a semiconductor processor that may or may not be physically and electrically coupled to such motherboard. The other components may include, but are not limited to, volatile memory (e.g., DRAM), non-volatile memory (e.g., ROM), flash memory, a graphics processor, a digital signal processor, a cryptoprocessor, a communication chip, a chipset, an antenna, a display, a touchscreen controller, a battery, an audio codec, a video codec, a power amplifier, a global positioning system (GPS) device, a compass, a Geiger counter, an accelerometer, a gyroscope, a speaker, a camera, and a mass storage device (such as hard disk drive, compact disk (CD), digital versatile disk (DVD), and so forth).

According to the present disclosure, a dual display system may include a plurality of communication chips. The communication chips may also operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. The communication chip may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip may operate in accordance with other wireless protocols in other aspects. For instance, a first communication chip may be dedicated to shorter range wireless communications such as Wi-Fi and Bluetooth and a second communication chip may be dedicated to longer range wireless communications such as GPS, EDGE, GPRS, CDMA, WiMAX, LTE, Ev-DO, and others.

In another aspect, the communication chip may enable wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some aspects they might not.

The communication chip may implement any of several wireless standards or protocols, including but not limited to Institute for Electrical and Electronics Engineers (IEEE) standards including Wi-Fi (IEEE 502.11 family), IEEE 502.16 standards (e.g., IEEE 502.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 502.16 compatible BWA networks are generally referred to as WiMAX networks, an acronym that stands for Worldwide Interoperability for Microwave Access, which is a certification mark for products that pass conformity and interoperability tests for the IEEE 502.16 standards.

Figure 12:
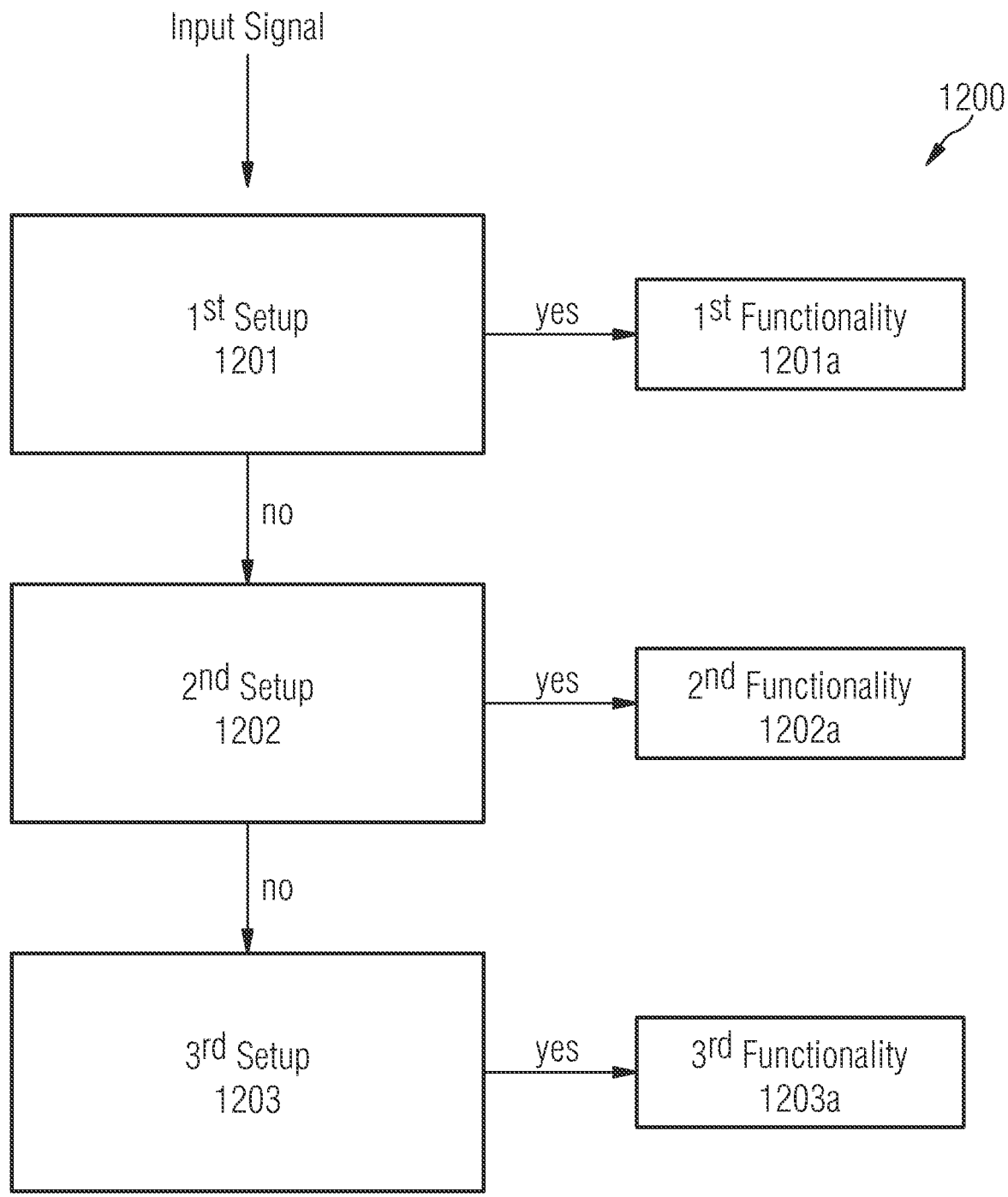
FIG. 12 shows a simplified flow diagram for an exemplary method for a dual display system according to an aspect of the present disclosure.

FIG. 12 shows a simplified flow diagram for an exemplary method for a dual display system 1200 according to an aspect of the present disclosure. In an aspect, a method uses a dual display system having a first display panel, a second display panel, and a connector assembly attached to the first and second display panels by setting a position for the first display panel and the second display panel by rotation around a first directional axis, a second directional axis, or a third directional axis and generating input signals to a control module on the position of the first and second display panels to provide a functionality for the system. In this aspect of the method, the system 1200 may provide additional input signals to the control module from a keyboard, a mouse, and/or a joystick.

In a further aspect of the method of the present disclosure, for a 1st setup 1201, rotating the first display panel and the second display panel around the first directional axis to position the first or the second display panel as a level surface for use as a virtual keyboard and the other display panel upright as a display and configuring the control module to generate output signals to have the system provide a $1^{st}$ functionality 1201a as a laptop computer.

In a yet further aspect of the method of the present disclosure, for 2nd set up 1202, rotating the first display panel and the second display panel around two directional axes to position the first display panel and the second display panel end-to-end for use as a panoramic display and configuring the control module to generate output signals to have the system provide a $2^{nd}$ functionality 1202a for the second display panel be an extension of the first display panel or vice versa.

In an additional further aspect of the method of the present disclosure, for $3^{rd}$ set up 1203, rotating the first display panel and the second display panel around the third directional axis position the first or the second display panel as a level surface for use as a touchpad and the other display panel upright as a display; and configuring the control module to generate output signals to have the system provide a $3^{rd}$ functionality 1203a as a tablet computer.

The foregoing aspects providing a method for a dual display system having modes of use, i.e., the setups and functionalities, are intended to be non-limiting. It will be apparent to those ordinary skilled practitioners that the foregoing method may be modified without departing from the spirit of the present disclosure.

To more readily understand and put into practical effect the present method and device for, particular aspects will now be described by way of examples. For the sake of brevity, duplicate descriptions of features and properties may be omitted.

EXAMPLES

Example 1 may include a system having a first panel having a first display area, a second panel having a second display area, and a connector assembly attached to the first and second panels to join the first panel to the second panel at an attachment point, the connector assembly configured to enable the first and second panels to rotate around three-directional axes passing through the attachment point.

Example 2 may include the system of example 1 and/or any other example disclosed herein, further including the first panel or the second panel having a control module.

Example 3 may include the system of example 2 and/or any other example disclosed herein, further including the first panel and the second panel having position sensors.

Example 4 may include the system of example 1 and/or any other example disclosed herein, further including the first panel having a first width and first length, and the second panel having a second width and second length, wherein the first width is smaller than the second width.

Example 5 may include the system of example 4 and/or any other example disclosed herein, in which the first panel is positioned over the second panel in a compact configuration, further including a viewable portion of the second display area uncovered by the first panel being configured to provide information or controls for a user.

Example 6 may include the system of example 1 and/or any other example disclosed herein, further including the first panel and the second panel having complementary paired magnets for joining the first and second panels in a panoramic mode.

Example 7 may include the system of example 6 and/or any other example disclosed herein, further including the first display area having a first aspect ratio, and the second display area having a second aspect ratio, in which the first and second aspect ratios are combined in the panoramic mode.

Example 8 may include the system of example 1 and/or any other example disclosed herein, in which the connector assembly further includes a multi-axial hinge.

Example 9 may include the system of example 1 and/or any other example disclosed herein, in which the system further includes a keyboard, a mouse, a joystick, and/or a panel stand.

Example 10 may include the system of example 1 and/or any other example disclosed herein, in which the first panel or the second panel further includes a fold-out panel to support the system for viewing.

Example 11 may include a connector assembly having an elongated member, and a hinge assembly, in which the elongated member and the hinge assembly are configured for movable attachment to a first display panel and a second display panel.

Example 12 may include the connector assembly of example 11 and/or any other example disclosed herein, in which the elongated member further includes a first section attached to a side edge of the first display panel, and a second section attached to a side edge of the second display panel, in which the first section is contiguous with the second section from near a proximal end to near a distal end of the elongated member and the first section and the second section are joined by the hinge assembly.

Example 13 may include the connector assembly of example 12 and/or any other example disclosed herein, in which the hinge assembly further includes a first component positioned near the proximal end of the elongated member, and a second component positioned near the distal end of the elongated member, in which the second component is fixedly attached to the first and second display panels for rotation by the first and second display panels around a first directional axis, a second directional axis, or a third directional axis.

Example 14 may include the connector assembly of example 13 and/or any other example disclosed herein, in which the hinge assembly further includes the first and second components both being engaged for rotation by the first and second display panels around the first directional axis and the second component only being engaged for rotation by the first and second display panels around the third directional axes.

Example 15 may include the connector assembly of example 12 and/or any other example disclosed herein, in which the second component of the hinge assembly further includes a multi-axial structure having a dual-axis member and a swivel member connected to the dual-axis member along one of the dual-axis.

Example 16 may include a method having a system with a first display panel, a second display panel, and a connector assembly attached to the first and second panels in a compact configuration, and setting a position for the first display panel and the second display panel by rotation around a first directional axis, a second directional axis, or a third directional axis, and generating input signals to a control module on the position of the first and second display panels to provide a functionality for the system.

Example 17 may include the method of example 16 and/or any other example disclosed herein, further including rotating the first display panel and the second display panel around the first directional axis to position the first or the second display panel as a level surface for use as a virtual keyboard and the other display panel upright as a display and configuring the control module to generate output signals to have the system function as a laptop computer.

Example 18 may include the method of example 16 and/or any other example disclosed herein, further including rotating the first display panel and the second display panel around two directional axes to position the first display panel and the second display panel end-to-end for use as a panoramic display and configuring the control module to generate output signals to have the second display panel be an extension of the first display panel or vice versa.

Example 19 may include the method of example 16 and/or any other example disclosed herein, further including rotating the first display panel and the second display panel around two directional axes to position the first or the second display panel as a level surface for use as a touchpad and the other display panel upright as a display and configuring the control module to generate output signals to have the system function as a tablet computer.

Example 20 may include the method of example 16 and/or any other example disclosed herein, further including providing additional input signals to the control module from a keyboard, a mouse, and/or a joystick.

It will be understood that any property described herein for a specific device may also hold for any device described herein. It will also be understood that any property described herein for a specific method may hold for any of the methods described herein. Furthermore, it will be understood that for any device or method described herein, not necessarily all the components or operations described will be enclosed in the device or method, but only some (but not all) components or operations may be enclosed.

The term "comprising" shall be understood to have a broad meaning similar to the term "including" and will be understood to imply the inclusion of a stated integer or operation or group of integers or operations but not the exclusion of any other integer or operation or group of integers or operations. This definition also applies to variations on the term "comprising" such as "comprise" and "comprises".

The term "coupled" (or "connected") herein may be understood as electrically coupled or as mechanically coupled, e.g., attached or fixed or attached, or just in contact without any fixation, and it will be understood that both direct coupling or indirect coupling (in other words: coupling without direct contact) may be provided.

While the present disclosure has been particularly shown and described with reference to specific aspects, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

What is claimed is:

1. A system comprising:
   a first panel comprising a first display area;
   a second panel comprising a second display area; and
   a connector assembly attached to the first and second panels to join the first panel to the second panel at an attachment point, the connector assembly configured to enable the first and second panels to rotate around three-directional axes passing through the attachment point;
   wherein the connector assembly comprises:
   an elongated member; and
   a hinge assembly, wherein the elongated member and the hinge assembly are configured for movable attachment to a first display panel and a second display panel;
   wherein the elongated member further comprises:
   a first section attached to a side edge of the first display panel; and
   a second section attached to a side edge of the second display panel, wherein the first section is contiguous with the second section from near a proximal end to near a distal end of the elongated member and wherein the first section and the second section are joined by the hinge assembly;
   wherein the hinge assembly further comprises a first component positioned near the proximal end of the elongated member; and a second component positioned near the distal end of the elongated member;
   wherein the first component comprises a first dual-axis component that is fixedly attached to the first display panel and the second display panel; wherein the first component is configured to permit the first display panel to rotate about a first axis, and wherein the first component is configured to permit the second display to rotate about a second axis; wherein the first axis is different from but parallel to the second axis;
   wherein the second component further comprises a second dual-axis component and a swivel member;
   wherein the second dual-axis component is configured to permit the first display panel to rotate about the first axis and the second display to rotate about the second axis;
   wherein the swivel member is configured to permit the first display to rotate about a third axis; wherein the first lies along a first plane, and wherein the third axis is perpendicular to the first plane.

2. The system of claim 1, further comprising the first panel or the second panel comprising a control module.

3. The system of claim 2, further comprising the first panel and the second panel comprising position sensors.

4. The system of claim 1, further comprising:
the first panel comprising a first width and first length; and
the second panel comprising a second width and second length, wherein the first width is smaller than the second width.

5. The system of claim 4, wherein the first panel is positioned over the second panel in a compact configuration, further comprising a viewable portion of the second display area uncovered by the first panel being configured to provide information or controls for a user.

6. The system of claim 1, further comprising the first panel and the second panel comprising complementary paired magnets for joining the first and second panels in a panoramic mode.

7. The system of claim 6, further comprising:
the first display area comprising a first aspect ratio; and
the second display area comprising a second aspect ratio, wherein the first and second aspect ratios are combined in the panoramic mode.

8. The system of claim 1, wherein the connector assembly further comprises a multi-axial hinge.

9. The system of claim 1, wherein the system further comprises a keyboard, a mouse, a joystick, and/or a panel stand.

10. The system of claim 1, wherein the first panel or the second panel further comprises a fold-out panel to support the system for viewing.

11. A connector assembly comprising:
an elongated member; and
a hinge assembly, wherein the elongated member and the hinge assembly are configured for movable attachment to a first display panel and a second display panel;
wherein the elongated member further comprises:
a first section attached to a side edge of the first display panel; and
a second section attached to a side edge of the second display panel, wherein the first section is contiguous with the second section from near a proximal end to near a distal end of the elongated member and wherein the first section and the second section are joined by the hinge assembly;
wherein the hinge assembly further comprises a first component positioned near the proximal end of the elongated member; and a second component positioned near the distal end of the elongated member;
wherein the first component comprises a first dual-axis component that is fixedly attached to the first display panel and the second display panel; wherein the first component is configured to permit the first display panel to rotate about a first axis, and wherein the first component is configured to permit the second display to rotate about a second axis;
wherein the first axis is different from but parallel to the second axis;
wherein the second component further comprises a second dual-axis component and a swivel member;
wherein the second dual-axis component is configured to permit the first display panel to rotate about the first axis and the second display to rotate about the second axis;
wherein the swivel member is configured to permit the first display to rotate about a third axis; wherein the first lies along a first plane, and wherein the third axis is perpendicular to the first plane.

* * * * *